United States Patent Office 3,210,259
Patented Oct. 5, 1965

3,210,259
EXTRACTIVE SEPARATION PROCESS
David Cornell, Stillwater, Okla., and James R. Fair, Dayton, Ohio, assignors to Monsanto Company, a corporation of Delaware
No Drawing. Filed June 26, 1961, Ser. No. 119,271
14 Claims. (Cl. 202—39.5)

The present invention relates generally to the separation, concentration, and/or purification of hydrocarbons having various degrees of unsaturation.

In a number of hydrocarbon processing operations including cracking, reforming, aromatizing and dehydrogenating, a wide spectrum of hydrocarbons is formed having various degrees of unsaturation or of solubility parameter, cohesive energy density, or internal pressure. It is therefore desirable to be able to make a type separation in order to remove substantially all of each individual family group of hydrocarbons, i.e., the paraffins, monoolefins, diolefins, naphthenes and aromatic hydrocarbons. Further separations such as one aromatic compound from another is also a desired objective. Conventional distillation methods are often poorly adapted to the separation and recovery of such classes of hydrocarbons in view of the small differences in the boiling points of the respective compounds. It has also been found that azeotropic distillation in which the azeotrope agents are added to reduce the boiling point of certain components is impractical because of the separation difficulties between such agents and the compounds with which the azeotrope has been formed.

It is an object of this invention to separate close-boiling hydrocarbons by extractive distillation using certain pyrrolidones as an entraining agent.

More particularly, it is an object of this invention to separate classes of aromatic hydrocarbons from each other by extractive distillation after these hydrocarbons have been separated from other classes of hydrocarbons, e.g., paraffins, monoolefins, and naphthenes by fraction of extractive distillation or by solvent extraction.

Still more particularly, it is an object of this invention to separate classes of aromatic hydrocarbons from mixtures thereof comprising unsubstituted aromatic hydrocarbons, aralkyls and aromatic hydrocarbons having unsaturated substituents, both olefinic and acetylenic, by extractive distillation using certain pyrrolidone compounds. For example, by the method of this invention it is possible to make a clean separation of ethylbenzene from styrene.

A still further object of this invention is to separate members within a single class of aromatic hydrocarbons. For example, 1-phenylbutene-1 is readily separated from 1-phenyl-1,3-butadiene.

Finally, by the method of this invention, it is possible to separate aromatic hydrocarbons having olefinic substituents such as styrene, from aromatic hydrocarbons having acetylenic substituents such as phenylacetylene.

According to the present invention the use of pyrrolidone compounds having the formula

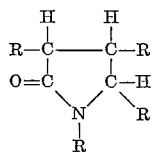

wherein R is selected from the group consisting of hydrogen and alkyl groups, preferably having from 1 to 6 carbon atoms and which may be the same or different, makes it possible to conduct extractive separations among the above-described classes of hydrocarbons. In carrying out the present invention utilizing the said pyrrolidones in an extractive distillation process, the pyrrolidone compound or a mixture thereof is introduced into a distillation column at a point near the top of the column. In this case the one hydrocarbon fraction is withdrawn as the overhead product, while the other hydrocarbon group is obtained as a bottoms product dissolved in the pyrrolidone as the extractive distillation solvent.

The present method is particularly applicable to the separation of hydrocarbons of the classes of aromatic hydrocarbons, as well as many individual members within such a class. The extractive distillation process using the said pyrrolidones yields a vapor fraction containing the more volatile of the said hydrocarbons. The volatility here referred to is that of the hydrocarbon when in solution in the pyrrolidone, such volatility being the product $\gamma P_V$, where $\gamma$ is the activity coefficient and $P_V$ is the vapor pressure of the hydrocarbon.

Relative volatility, $\alpha$, is, therefore the ratio of the $P_V$ products for two hydrocarbons.

The comparative selectivity of an extractive distillation solvent is best determined by its specific efficiency with respect to the hydrocarbon pair which are to be separated in the present method. This efficiency may be expressed as the relative volatility of the two hydrocarbons in the presence of the pyrrolidone solvent. The equation which expressed this relative volatility (alpha) is:

$$\alpha = \frac{(\gamma P_V) \text{ hydrocarbon 1}}{(\gamma P_V) \text{ hydrocarbon 2}}$$

where (gamma) represents the activity coefficient defined by the following equation:

$$\gamma_1 = \frac{Y_1 P_T}{X_1 P_{V_1}}$$

In the above equation $X_1$ and $Y_1$ represent the mole fractions of a given component in the liquid and vapor phases, respectively, while $P_V$ and $P_T$ represent the vapor pressure of the given component, and the total pressure of the system respectively.

In addition to selectivity, solubility of hydrocarbons in the pyrrolidones must be considered. The quantity of hydrocarbon dissolved in the pyrrolidones is governed by the temperature and pressure of the separation and by the character of the pyrrolidone and the hydrocarbon system.

The term, solubility parameter, is used in preference to the terms internal pressure or cohesive energy density. These terms are essentially equivalent. Cohesive energy density is the square of the solubility parameter, while internal pressure is 41.311×cohesive energy density.

The definition of the solubility parameter referred to in the previous paragraphs is as follows:

$\delta = (\Delta E/V)^{1/2}$
$\Delta E$=internal energy of vaporization, calories/(g. mole)
$V$=molal liquid volumn, cc./(g. mole)

For the condition of ideal gases, $\Delta E$ may be calculated from handbook values of the latent heat of vaporization, $\Delta H\nu$. The temperatures are expressed as degrees, Kelvin.
$\Delta E = \Delta H\nu - RT$
$\Delta H\nu$=latent heat of vaporization, calories/(g. mole)
$R$=1.987 calories/(g. mole) (° W.)
$T$=absolute temperature, ° K.

Aromatic hydrocarbons having unsaturated side chains exhibit much greater miscibility with pyrrolidone solvents than do the aralkyl hydrocarbons. Accordingly, a separation can be effected through either a difference in degree of saturation or, through a difference in solubility parameter.

The present method is efficacious as an extractive process with a wide variety of crude aromatic hydrocarbon mixtures. Examples of such starting mixtures include the crude aromatic hydrocarbons separated from mixtures of naphthenes and aromatic hydrocarbons obtained in the aromatizing of normal hexane and the subsequent dehydrogenation of such crude mixture to produce benzene.

The proportion of the pyrrolidone mixture employed in the present extractive separation method varies over the range of from 0.5 to 10 moles of the said pyrrolidone per mole of the crude hydrocarbon mixture, a preferred range being from 1 to 5 moles. The separation process may be operated over a wide range of temperatures such as from 100° F. to 300° F., the upper temperature being limited by the tendency of the hydrocarbon to polymerize rather than any inherent limitation of the extractive distillation process. The use of vacuum or pressure conditions in addition to atmospheric pressure is also a part of the present invention, such expedients being utilized in accordance with conventional practice in order to aid in the separation of low boiling components or in order to maintain high boiling components in the liquid without undue volatilization.

The apparatus employed in the extractive distillation process is typical of the equipment available in this field. It is obvious that such a distillation process may be conducted with any conventional distillation column of the bubble-plate, packed, or sieve-plate type as may be desired. The selection of the best reflux ratio, size and number of plates and other details of column design necessary in order to obtain the desired degree of purity will be obvious to one skilled in the art having the benefit of the present disclosure. If necessary to prevent or minimize the polymerization of unsaturated compounds, conventional polymerization inhibitors may also be used.

The apparatus employed consitittes a conventional extractive distillation column in which the crude mixture of hydrocarbons is charged to the middle region of a column with reflux being returned near the top of the column, while the overhead vapor fraction is withdrawn as an enriched stream of the material with the higher degree of saturation (or lower solubility parameter). The pyrrolidone solvent from any source is introduced into the column at a plate located several plates below the top of the column. The bottoms stream leaving the column contains the material with the lower degree of saturation or higher solubility parameter, together with the pyrrolidone solvent. When more than one class of hydrocarbons is present in the vapor and/or liquid fractions, these fractions may be separately further treated with the extractive distillation solvent to effect further hydrocarbon separations or, where the boiling points of miscibilities of the various hydrocarbons are sufficiently different, other techniques such as fractional distillation or solvent extraction separation are suitable. In subsequent extractive distillations the more volatile hydrocarbon(s) is withdrawn as overhead vapors and the less volatile hydrocarbon(s) is withdrawn as liquid bottoms. The mixture of solute and solvent in the bottoms fraction is then separated into its components by conventional stripping or separation means, which may comprise the use of water washing, distillation, solvent extraction or freezing, by which means one may obtain the bottoms solute in the desired pure state. For example, one may employ a conventional fractionation or stripper column, wherein by simple fractional distillation the solute from the bottoms product is recovered as the overhead fraction of the stripper in pure form. In another type of column the bottoms solute in admixture with the solvent is fed into the middle region of a column, while steam or another heated inert gas is fed to the bottom of the column. The overhead product from such stripping operation is the pure solute, while the solvent is obtained as the bottoms product which is then dried and recycled to the main distillation column, as described above.

The pyrrolidones described above are particularly advantageous in the present process, since these materials are relatively stable against decomposition and are non-reactive with respect to the hydrocarbons as well as any impurities which are conventionally found in such crude mixtures. It is also an advantage that pyrrolidones are relatively non-toxic and are relatively inexpensive materials. The use of pyrrolidones as herein disclosed makes it possible to separate close-boiling aromatic hydrocarbons in a considerably smaller column than would be required for conventional distillation.

The following examples illustrate specific embodiments of the invention:

EXAMPLE 1

A number of aromatic hydrocarbon-type mixtures are employed in order to demonstrate the selectivity of N-methyl-2-pyrrolidone as an extractive distillation solvent. These tests are conducted at a number of temperatures as set forth in the table below. At the said temperatures at which the equilibrium measurements are made, at the solvent ratio set forth in Table I, the relative volatility of the two components is determined. These values of relative volatility are defined in accordance with the description above.

The table of data also shows the enhancement per plate obtained when using a 10% (mole) solution of the more volatile component of each pair with 90% of the less volatile in an extractive distillation using N-methyl-2-pyrrolidone as the solvent.

"Enhancement per plate" is calculated according to the expression $$Y = \frac{\alpha X}{1 + (\alpha - 1)X}$$

the percentage enhancement being 100Y. In the expression, Y and X refer to vapor and liquid molar compositions, respectively, of the more volatile hydrocarbon, taken on a solvent-free basis. Thus, $Y=0.129$ as opposed to $X=0.100$ indicates an enhancement of 12.9%.

*Table I*

| Run | Solute | X mole Fr | Y mole Fr | Press., mm. Hg (total) | t., °F. | Pv, mm. Hg vapor | α |
|---|---|---|---|---|---|---|---|
| 1 | Ethylbenzene | 0.3030 | 0.5540 | 50.0 | 155 | 78 | 1.65 |
|   | Styrene | 0.4020 | 0.4460 |  |  | 60 | 1.00 |
| 2 | o-Ethyl Toluene | 0.2500 | 0.5720 | 52.0 | 212 | 101.6 | 1.34 |
|   | o-Vinyl Toluene | 0.2500 | 0.4280 |  |  | 83.2 | 1.00 |
| 3 | Cumene | 0.2500 | 0.6526 | 77.5 | 212 | 155.6 | 1.88 |
|   | α-Methylstyrene | 0.2500 | 0.3474 |  |  | 101.6 | 1.00 |
| 4 | Indane | 0.2500 | 0.5660 | 33.2 | 212 | 71.5 | 1.30 |
|   | Indene | 0.2500 | 0.4340 |  |  | 57.0 | 1.00 |
| 5 | Tetralin | 0.2500 | 0.5923 | 74.0 | 302 | 160.8 | 1.45 |
|   | Naphthalene | 0.2500 | 0.4077 |  |  | 120.7 | 1.00 |
| 6 | Butylbenzene | 0.2500 | 0.7226 | 138.7 | 302 | 310.7 | 2.61 |
|   | 1-phenyl-1,3-butadiene | 0.2500 | 0.2774 |  |  | 147.9 | 1.00 |
| 7 | Propylbenzene | 0.2500 | 0.6318 | 62.2 | 212 | 124.7 | 1.72 |
|   | Allyl Benzene | 0.2500 | 0.3682 |  |  | 87.2 | 1.00 |
| 8 | Ethylbenzene | 0.2500 | 0.6244 | 38.7 | 155 | 78 | 1.66 |
|   | Phenyl Acetylene | 0.2500 | 0.3756 |  |  | 57.6 | 1.00 |
| 9 | Cumene | 0.2500 | 0.7843 | 66.5 | 212 | 155.6 | 3.63 |
|   | Methyl Phenyl Acetylene | 0.2500 | 0.2157 |  |  | 56.2 | 1.00 |
| 10 | Styrene | 0.2500 | 0.5244 | 31.2 | 155 | 60 | 1.10 |
|    | Phenylacetylene | 0.2500 | 0.4756 |  |  | 57.6 | 1.00 |
| 11 | Phenyl Butane | 0.1000 | 0.5209 | 90.7 | 302 | 310.7 | 2.85 |
|    | 1-phenylbutene-1 | 0.1000 | 0.2964 |  |  | 205.1 | 1.62 |
|    | 1-phenyl-1, 3-butadiene | 0.1000 | 0.1827 |  |  | 147.9 | 1.00 |
| 12 | Ethylbenzene | 0.1000 | 0.4319 | 25.7 | 155 | 78 | 1.76 |
|    | Styrene | 0.1000 | 0.3322 |  |  | 60 | 1.35 |
|    | Phenylacetylene | 0.1000 | 0.2359 |  |  | 57.6 | 1.00 |

EXAMPLE 2

The method of Example 1 for the determination of relative volatility is repeated utilizing 2-pyrrolidone as the extractive distillation solvent. The relative volatilities of the respectve hydrocarbon mixtures are set forth in Table II below. The table of data also shows the enhancement per plate obtained using a 10% (mole) solution of the more volatile component of each pair with 90% of the less volatile in an extractive distillation using 2-pyrrolidone as the solvent.

clude 1,5-dimethyl-2-pyrrolidone, 3,4,5-triethyl-2-pyrrolidone, N-propyl-2-pyrrolidone, 3,4-dipropyl-5- methyl-2-pyrrolidone, 3,5-dibutyl-2-pyrrolidone, N-ethyl-4-propyl-2-pyrrolidone, N-methyl-4-hexyl-2-pyrrolidone, 3,5-diamyl - 2 - pyrrolidone, 3-ethyl-4,5-dimethyl-2-pyrrolidone and 1,3,4,5-tetramethyl-2-pyrrolidone.

Other examples of aromatic hydrocarbons separable according to the method described herein include α-methylstyrene from methylphenylacetylene, propylbenzene from phenyl propadiene, 1-methyl-(2,3 or 4)-vinyl benzene

*Table II*

| Run | Solute | X mole Fr | Y mole Fr | Press., mm. Hg (total) | t., °F. | Pv, mm. Hg vapor | α |
|---|---|---|---|---|---|---|---|
| 1 | Ethylbenzene | 0.2200 | 0.6266 | 50.0 | 160 | 78 | 1.70 |
|   | Styrene | 0.2230 | 0.3740 |  |  | 60 | 1.00 |
| 2 | o-Ethyl Toluene | 0.2000 | 0.6122 | 52.8 | 212 | 101.6 | 1.58 |
|   | o-Vinyl Toluene | 0.2000 | 0.3878 |  |  | 83.2 | 1.00 |
| 3 | Cumene | 0.2000 | 0.6786 | 78.4 | 212 | 155.6 | 2.11 |
|   | α-Methylstyrene | 0.2000 | 0.3214 |  |  | 101.6 | 1.00 |
| 4 | Indane | 0.2000 | 0.581 | 28.8 | 212 | 71.5 | 1.39 |
|   | Indene | 0.2000 | 0.419 |  |  | 57.0 | 1.00 |
| 5 | Tetralin | 0.2000 | 0.6140 | 64.4 | 302 | 160.8 | 1.59 |
|   | Naphthalene | 0.2000 | 0.3860 |  |  | 120.7 | 1.00 |
| 6 | Butylbenzene | 0.2000 | 0.6993 | 149.3 | 302 | 310.7 | 2.33 |
|   | 1-phenyl-1,3-butadiene | 0.2000 | 0.3007 |  |  | 147.9 | 1.00 |
| 7 | Propylbenzene | 0.2500 | 0.6461 | 69.5 | 212 | 124.7 | 1.83 |
|   | Allylbenzene | 0.2500 | 0.3539 |  |  | 87.2 | 1.00 |
| 8 | Ethylbenzene | 0.2500 | 0.6455 | 42.6 | 155 | 78 | 1.82 |
|   | Phenyl Acetylene | 0.2500 | 0.3545 |  |  | 57.6 | 1.00 |
| 9 | Cumene | 0.2500 | 0.8018 | 75.7 | 212 | 155.6 | 4.05 |
|   | Methyl Phenylacetylene | 0.2500 | 0.1982 |  |  | 56.2 | 1.00 |
| 10 | Styrene | 0.2000 | 0.5396 | 28.0 | 155 | 60 | 1.17 |
|   | Phenylacetylene | 0.2000 | 0.4604 |  |  | 57.6 | 1.00 |
| 11 | Phenyl Butane | 0.1000 | 0.5396 | 112.3 | 302 | 310.7 | 3.21 |
|   | 1-phenylbutene-1 | 0.1000 | 0.2921 |  |  | 205.1 | 1.74 |
|   | 1-phenyl-1,3-butadiene | 0.1000 | 0.1683 |  |  | 147.9 | 1.00 |
| 12 | Ethylbenzene | 0.1000 | 0.4882 | 28.3 | 155 | 78 | 2.09 |
|   | Styrene | 0.1000 | 0.2778 |  |  | 60 | 1.19 |
|   | Phenylacetylene | 0.1000 | 0.2340 |  |  | 57.6 | 1.00 |

EXAMPLE 3

The method of Examples 1 and 2 is repeated utilizing N-hexyl-2-pyrrolidone as the extractive distillation solvent. The relative volatilities of the respective hydrocarbon mixtures are set forth in Table III. The table of data also shows the enhancement per plate obtained using a 10% (mole) solution of the more volatile component of each pair with 90% of the less volatile in an extractive distillation using N-hexyl-2-pyrrolidone as the solvent.

from methylethylbenzene, 1-phenyl-1,3-butadiene from phenyl butene-1, 2-phenyl-1,3-butadiene from phenyl butene-1, o-, m- and p-isomers of ethyl toluene and vinyl toluene.

The foregoing examples are merely illustrative of the invention and are not to be considered exhaustive of the scope of the invention.

What is claimed is:

1. The method of separating classes of aromatic hydrocarbons from a mixture comprising hydrocarbons se-

*Table III*

| Run | Solute | X mole Fr | Y mole Fr | Press., mm. Hg (total) | t., °F. | Pv, mm. Hg vapor | α |
|---|---|---|---|---|---|---|---|
| 1 | Ethylbenzene | 0.2500 | 0.5843 | 37.34 | 155 | 78 | 1.44 |
|   | Styrene | 0.2500 | 0.4157 |  |  | 60 | 1.00 |
| 2 | o-Ethyl Toluene | 0.2500 | 0.5660 | 49.4 | 212 | 101.6 | 1.30 |
|   | o-Vinyl Toluene | 0.2500 | 0.4340 |  |  | 83.2 | 1.00 |
| 3 | Cumene | 0.1500 | 0.6552 | 47.7 | 212 | 155.6 | 1.90 |
|   | α-Methylstyrene | 0.1500 | 0.3448 |  |  | 101.6 | 1.00 |
| 4 | Indane | 0.1000 | 0.5662 | 13.1 | 212 | 71.5 | 1.31 |
|   | Indene | 0.1000 | 0.4338 |  |  | 57.0 | 1.00 |
| 5 | Tetralin | 0.1000 | 0.5830 | 29.0 | 302 | 160.8 | 1.40 |
|   | Naphthalene | 0.1000 | 0.4170 |  |  | 120.7 | 1.00 |
| 6 | Butylbenzene | 0.1000 | 0.7292 | 59.6 | 302 | 310.7 | 2.69 |
|   | 1-phenyl-1,3-butadiene | 0.1000 | 0.2708 |  |  | 147.9 | 1.00 |
| 7 | Propylbenzene | 0.1000 | 0.6409 | 26.5 | 212 | 124.7 | 1.78 |
|   | Allylbenzene | 0.1000 | 0.3591 |  |  | 87.2 | 1.00 |
| 8 | Ethylbenzene | 0.1000 | 0.6311 | 15.9 | 155 | 78 | 1.71 |
|   | Phenylacetylene | 0.1000 | 0.3689 |  |  | 57.6 | 1.00 |
| 9 | Cumene | 0.1000 | 0.7943 | 28.4 | 212 | 155.6 | 3.86 |
|   | Methyl Phenylacetylene | 0.1000 | 0.2057 |  |  | 56.2 | 1.00 |
| 10 | Styrene | 0.1000 | 0.5353 | 12.3 | 155 | 60 | 1.15 |
|   | Phenylacetylene | 0.1000 | 0.4647 |  |  | 57.6 | 1.00 |
| 11 | Phenyl Butane | 0.1000 | 0.5073 | 80.2 | 302 | 310.7 | 2.62 |
|   | 1-phenylbutene-1 | 0.1000 | 0.2991 |  |  | 205.1 | 1.54 |
|   | 1-phenyl-1,3-butadiene | 0.1000 | 0.1936 |  |  | 147.9 | 1.00 |
| 12 | Ethylbenzene | 0.1000 | 0.4425 | 21.9 | 155 | 78 | 1.66 |
|   | Sytrene | 0.1000 | 0.2911 |  |  | 60 | 1.09 |
|   | Phenylacetylene | 0.1000 | 0.2664 |  |  | 57.6 | 1.00 |

The foregoing examples represent typical extractive distillation separations using the pyrrolidone solvents described herein. Other typical solvents suitable herein include lected from the class consisting of unsubstituted aromatic hydrocarbons, partially hydrogenated aromatic hydrocarbons, aralkanes, aralkenes and aralkynes which comprises contacting the said mixture with a pyrrolidone solvent having the formula

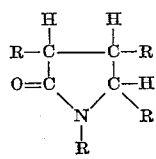

wherein R is selected from the group consisting of hydrogen and alkyl radicals, in an extractive distillation separation, withdrawing a vapor fraction containing the more volatile of said classes, and also withdrawing a liquid fraction containing the less volatile classes dissolved in the said pyrrolidone solvent, and thereafter separating the individual hydrocarbons from each of said fractions by conventional means and stripping the said solvent from the hydrocarbons dissolved therewith.

2. The method of separating unsubstituted aromatic hydrocarbons from a mixture of the same together with partially hydrogenated aromatic hydrocarbons which comprises contacting the said mixture with a pyrrolidone solvent having the formula

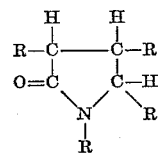

wherein R is selected from the group consisting of hydrogen and alkyl radicals, in an extractive distillation separation, withdrawing a vapor fraction containing the said partially hydrogenated aromatic hydrocarbon and also withdrawing a liquid fraction containing the said unsubstituted aromatic hydrocarbon dissolved in said pyrrolidone solvent and thereafter stripping the said solvent from the hydrocarbons dissolved therein.

3. Method of claim 2 wherein said partially hydrogenated aromatic hydrocarbon is indane and said unsubstituted aromatic hydrocarbon is indene.

4. Method of claim 2 wherein said partially hydrogenated aromatic hydrocarbon is tetralin; and said unsubstituted aromatic hydrocarbon is naphthalene.

5. The method of separating aralkanes from a mixture of the same together with aralkenes which comprises contacting the said mixture with a pyrrolidone solvent haivng the formula

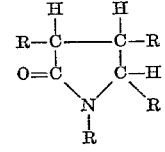

wherein R is selected from the group consisting of hydrogen and alkyl radicals, in an extractive distillation separation, withdrawing a vapor fraction containing the aralkanes and also withdrawing a liquid fraction containing the aralkenes dissolved in said pyrroldine solvent and thereafter stripping the said solvent from the aralpenes dissolved therein.

6. Method of claim 5 wherein said aralkane is ethylbenzene and said aralkene is styrene.

7. Method of claim 5 wherein said aralkane is cumene and said aralkene is α-methylstyrene.

8. Method of claim 5 wherein said pyrrolidone is 2-pyrrolidone.

9. Method of claim 5 wherein said pyrrolidone is N-methyl-2-pyrrolidone.

10. The method of separating aralkanes from a mixture of the same together with aralkynes which comprises contacting the said mixture with a pyrrolidone solvent having the formula

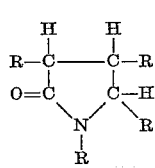

wherein R is selected from the group consisting of hydrogen and alkyl radicals, in an extractive distillation separation, withdrawing a vapor fraction containing the aralkanes and also withdrawing a liquid fraction containing the aralkynes dissolved in said pyrrolidone solvent and thereafter stripping the said solvent from the aralkynes dissolved therein.

11. Method of claim 10 wherein said aralkane is ethylbenzene and said aralkyne is phenylacetylene.

12. Method of claim 10 wherein said aralkane is cumene and said aralkyne is methylphenylacetylene.

13. The method of separating aralkenes from a mixture of the same together with aralkynes which comprises contacting the said mixture with a pyrrolidone solvent having the formula

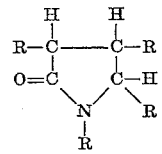

wherein R is selected from the group consisting of hydrogen and alkyl radicals, in an extractive distillation separation, withdrawing a vapor fraction containing the aralkenes and also withdrawing a liquid fraction containing the aralkynes dissolved in said pyrrolidone solvent and thereafter stripping the said solvent from the aralkynes dissolved therein.

14. Method of claim 13 wherein said aralkyne is phenylacetylene and said aralkene is styrene.

References Cited by the Examiner

UNITED STATES PATENTS

| | | | |
|---|---|---|---|
| 2,730,558 | 1/56 | Gerhold | 260—674 |
| 2,737,538 | 3/56 | Nelson | 208—313 |
| 2,753,381 | 7/56 | Nelson | 208—326 |
| 2,771,494 | 11/56 | Weedman | 208—326 |
| 2,840,511 | 6/58 | Rylander et al. | 208—326 |
| 2,849,396 | 8/58 | Nelson | 208—326 |
| 2,943,122 | 6/60 | Templeman et al. | 260—674 |
| 3,082,271 | 3/63 | Weitz et al. | 208—326 |

DANIEL E. WYMAN, *Primary Examiner.*

ALPHONSO D. SULLIVAN, *Examiner.*